US012310912B1

(12) United States Patent
Liu et al.

(10) Patent No.: US 12,310,912 B1
(45) Date of Patent: May 27, 2025

(54) SEXUAL STIMULATION DEVICE

(71) Applicant: HYTTO PTE. LTD, Singapore (SG)

(72) Inventors: Dan Liu, Singapore (SG); Jilin Qiu, Singapore (SG)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 18/800,144

(22) Filed: Aug. 12, 2024

(51) Int. Cl.
*A61H 19/00* (2006.01)

(52) U.S. Cl.
CPC .................................... *A61H 19/34* (2013.01)

(58) Field of Classification Search
CPC ........ A61H 19/34; A61H 19/40; A61H 19/44; A61H 19/00; A61H 2201/0188
See application file for complete search history.

(56) References Cited

U.S. PATENT DOCUMENTS 10,945,914 B1 * 3/2021 Liu ...................... G06Q 20/123
2013/0261385 A1 * 10/2013 Zipper ............... A61H 23/0263 600/38
2018/0125748 A1 * 5/2018 Goldenberg ....... A61H 23/0263
2021/0161757 A1 * 6/2021 Murison ................ A61H 19/34
2023/0355463 A1 * 11/2023 Cirillo-Schmidt .......................... A61H 23/0263

* cited by examiner

*Primary Examiner* — Margaret M Luarca
*Assistant Examiner* — Sarah B Lederer
(74) *Attorney, Agent, or Firm* — Evergreen Valley Law Group; Kanika Radhakrishnan

(57) ABSTRACT

The present disclosure discloses a sexual stimulation device. The sexual stimulation device includes a housing. The housing includes a first portion, a second portion, and a connecting member connecting the first portion to the second portion. The first portion corresponds to a stimulation portion for providing sexual stimulation to a user. The sexual stimulation device further includes an optical effect generating member configured in the second portion. The optical effect generating member includes a first optical layer exposed to an external environment. The optical effect generating member is configured to generate at least one optical effect through the first optical layer based on receipt of at least one light source on at least the first optical layer.

19 Claims, 8 Drawing Sheets

SEXUAL STIMULATION DEVICE

TECHNICAL FIELD

The present disclosure relates to a sexual stimulation device and, more particularly relates to the sexual stimulation device for providing stimulation to the erogenous zones of a user and generating optical effects.

BACKGROUND

Masturbation is generally referred to as a natural and safe way to explore one's body i.e. stimulation of genital organs to obtain sexual pleasure. Typically, people use conventional techniques for exploring one's body (irrespective of gender) to attain sexual pleasure. However, the conventional techniques are generally unhygienic and thus not desirable.

Sex toys are designed in a variety of configurations and perform a variety of functions, ranging from medical therapy to erotic stimulation. For example, the sex toys such as dildos are used by female users for masturbating. Such sex toys are generally phallic-shaped and are simpler to use for providing sexual pleasure to female users. Additionally, such sex toys include a vibration feature for enhancing sexual stimulation to female genital organs (e.g., vaginal area). However, the usage of sex toys in the genitals (e.g., vaginal area) for experiencing sexual stimulation can lead to irritations or inflammations of the skin near the genital organs (or the vaginal area). Further, the usage of these sex toys to provide sexual pleasure is fairly limited and is not designed specifically to accommodate the different physiologies (or arousals) of different users. Thus, such sex toys may not provide the desired and satisfactory sexual pleasure to the users.

Therefore, there is a need for a sexual stimulation device to provide enhanced sexual pleasure, in order to overcome one or more limitations stated above in addition to providing other technical advantages.

SUMMARY

Various embodiments of the present disclosure provide a sexual stimulation device.

In an embodiment, a sexual stimulation device is disclosed. The sexual stimulation device includes a housing. The housing includes a first portion and a second portion. The sexual stimulation device further includes a connecting member connecting the first portion to the second portion. The first portion corresponds to a stimulation portion for providing sexual stimulation to a user. The sexual stimulation device further includes an optical effect generating member configured in the second portion. The optical effect generating member includes a first optical layer exposed to an external environment. The optical effect generating member is configured to generate at least one optical effect through the first optical layer based on receipt of at least one light source on at least the first optical layer.

In another embodiment, a sexual stimulation device for providing sexual stimulation and generating optical effects is disclosed. The sexual stimulation device includes a housing. The housing includes a first portion and a second portion. The sexual stimulation device further includes a connecting member connecting the first portion to the second portion. The first portion corresponds to a stimulation portion for providing sexual stimulation to a user. The sexual stimulation device further includes an optical effect generating member configured in the second portion. The optical effect generating member includes a first optical layer exposed to an external environment and a second optical layer disposed within the housing. Further, the sexual stimulation device includes a radiating lighting element disposed in the housing and operatively coupled to the optical effect generating member. The sexual stimulation device further includes a light guiding element disposed in the housing. The light guiding element is operatively coupled to at least the radiating lighting element, the first optical layer and the second optical layer of the optical effect generating member. The optical effect generating member is configured to generate at least one optical effect through the first optical layer based on receipt of at least one light source on at least the first optical layer and the second optical layer. The at least one light source includes a first light source being emitted by the radiating lighting element onto the light guiding element. The light guiding element is configured to direct the first light source emanating from the radiating lighting element onto at least the first optical layer and the second optical layer of the optical effect generating member.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various example embodiments of the present disclosure are described hereinafter with reference to FIGS. 1A-1C to FIG. 5.

Figure 1A:
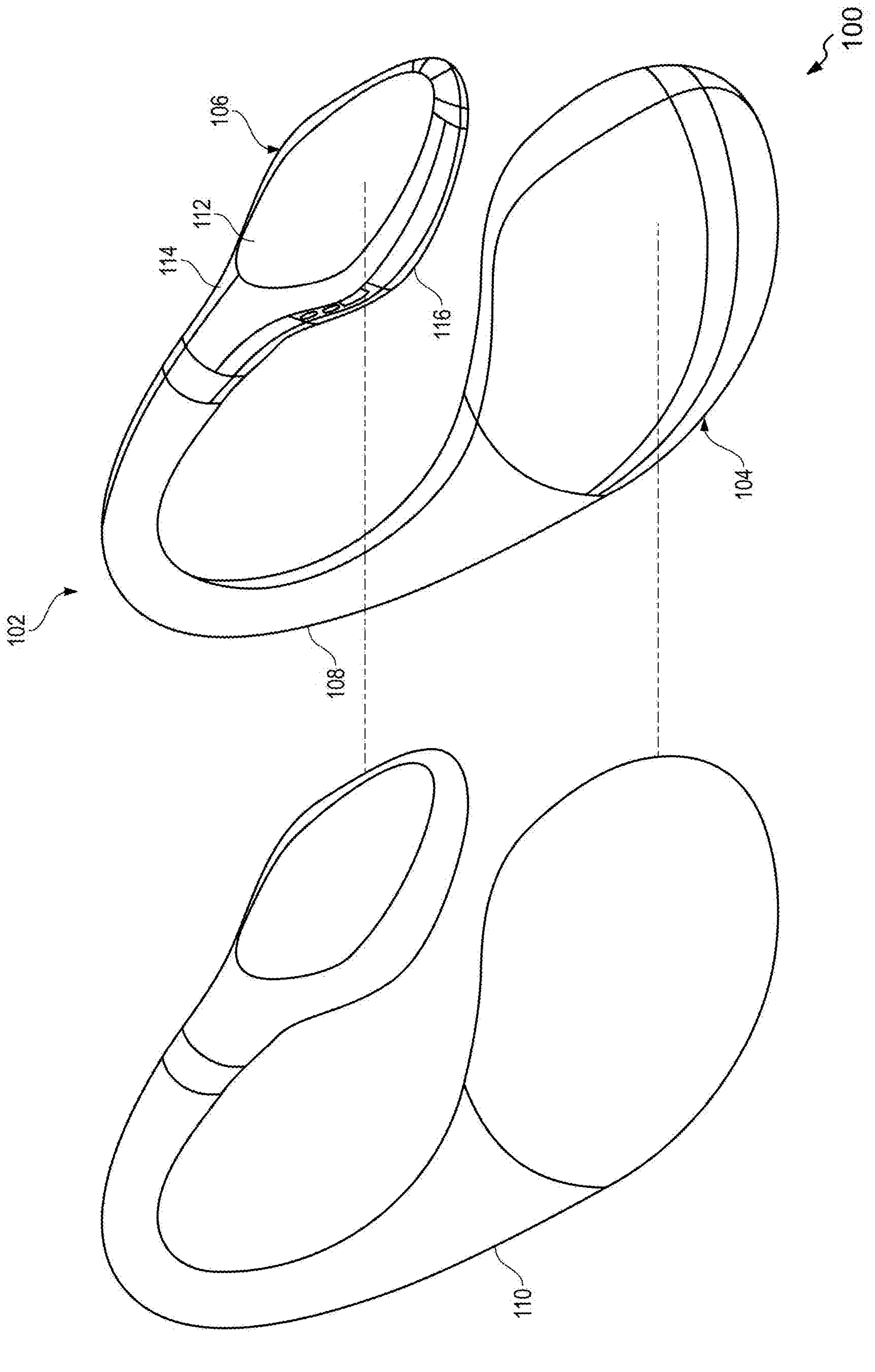
FIGS. 1A, 1B, and 1C illustrate perspective views of a sexual stimulation device, in accordance with an embodiment of the present disclosure.
Figure 1B:
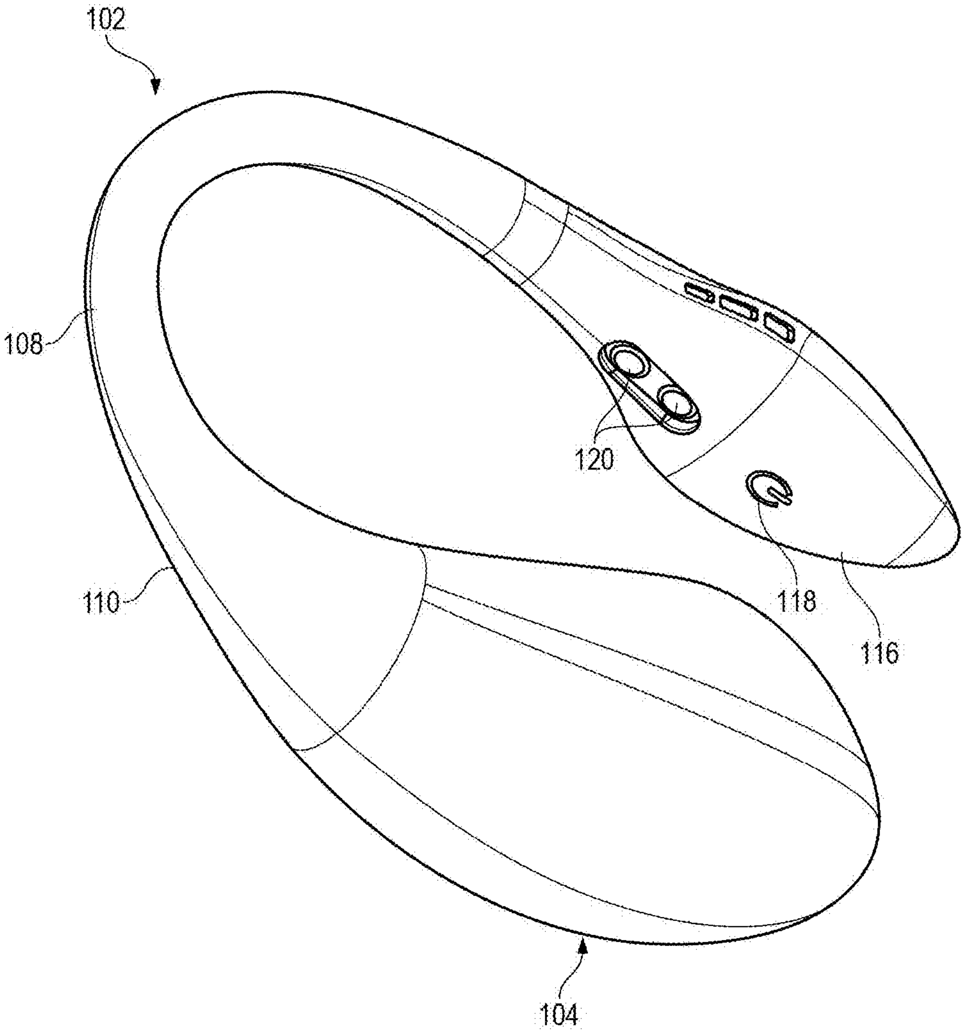
Figure 1C:
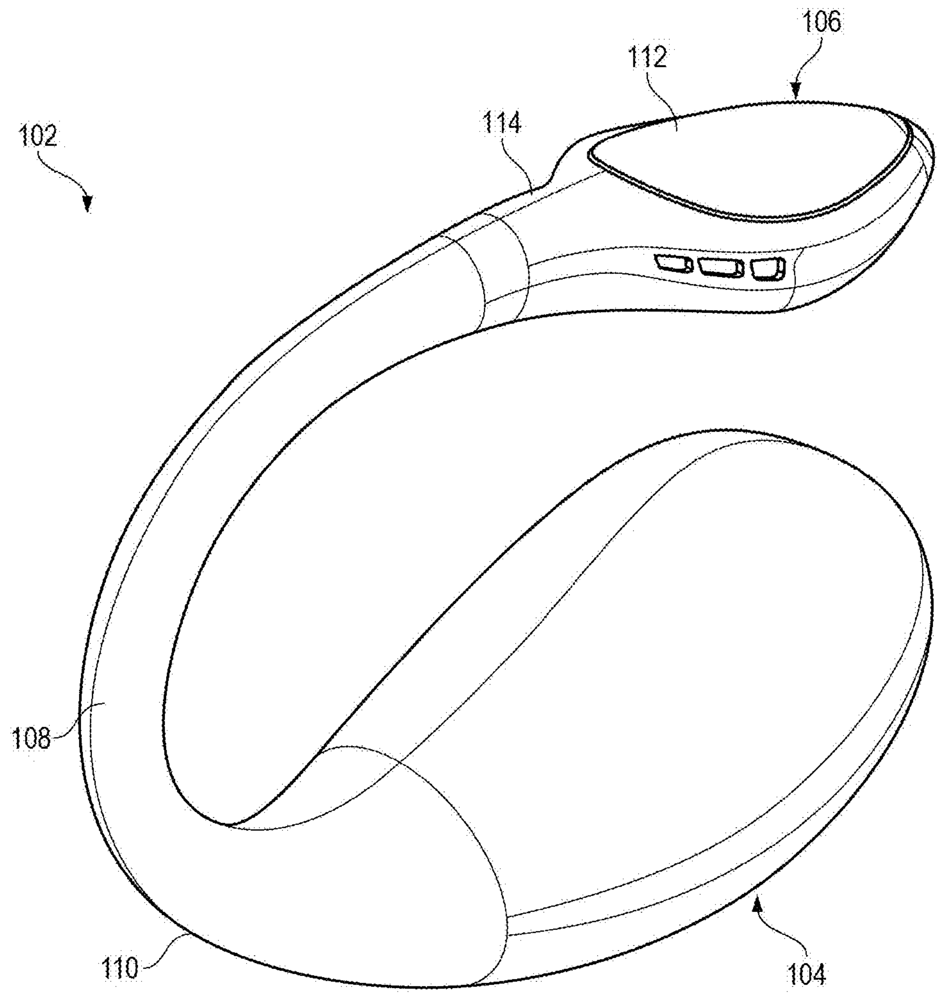

FIGS. 1A, 1B and 1C illustrate perspective views of a sexual stimulation device 100, in accordance with an embodiment of the present disclosure. The sexual stimulation device 100 is operated to provide sexual stimulation to the genital organs of users. As shown, the sexual stimulation device 100 may include at least one phallic shaft (or phallic-shaped configuration) for stimulating the genitals. Specifically, the sexual stimulation device 100 is configured with stimulating members for simultaneously stimulating one or more erogenous zones and/or the genital organs. In an example scenario, the sexual stimulation device 100 may be used by female users for stimulating one or more erogenous zones of the female genitalia (such as the clitoris and vaginal area).

The sexual stimulation device 100 includes a housing 102. The housing 102 includes a first portion 104, a second portion 106, and a connecting member 108. The connecting member 108 connects the first portion 104 and the second portion 106. The connecting member 108 is made of flexible materials, for example, polymers, rubber, and the like. The connecting member 108 made of the flexible materials enables the sexual stimulation device 100 to be temporarily deformed for operating the sexual stimulation device 100. In other words, the connecting member 108 made of flexible materials enables the first portion 104 and the second portion 106 to be oriented at different orientations for experiencing sexual stimulation as per the feasibility and requirements of the user.

Further, the first portion 104 corresponds to a stimulation portion of the sexual stimulation device 100. The first portion 104 is configured to provide sexual stimulation to a user. In other words, the first portion 104 may be configured to be of an optimum length sufficient for suitably stimulating various erogenous regions and/or zones of the genitals. In some embodiments, the first portion 104 may be configured with protrusions, ridges, bumps, dimples, or any other impressions for enhancing sexual pleasure. The housing 102 including the first portion 104, the second portion 106, and the connecting member 108 may be configured with materials that are safe for use on human skin. For example, the housing 102 may be made of materials such as, but not limited to, thermoplastic, porcelain, borosilicate, and the like.

The sexual stimulation device 100 includes a covering member 110 configured to cover at least a portion of the housing 102 (as shown in FIG. 1C). The covering member 110 is made of silicone. In other words, the covering member 110 made of silicone is inserted over the housing 102 to cover at least the portion of the housing 102. The silicone (or the covering member 110) inserted over the housing 102 provides a hassle-free experience to the user while using the sexual stimulation device 100. Further, the covering member 110 inserted over the housing 102 avoids penetration of bodily fluids into the housing 102.

Figure 5:
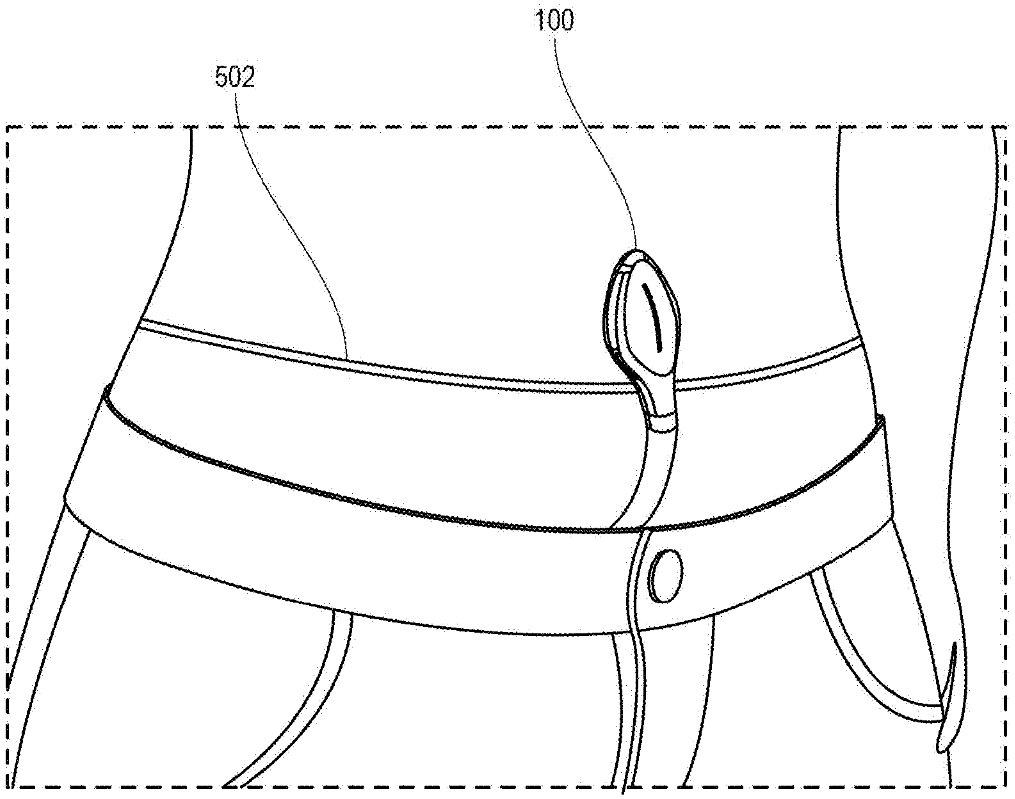
FIG. 5 illustrates a schematic representation of the sexual stimulation device being worn by a user, in accordance with another embodiment of the present disclosure.

The sexual stimulation device 100 further includes an optical effect generating member 112. The optical effect generating member 112 is configured in the second portion 106. In other words, the optical effect generating member 112 is mounted on a first side 114 of the second portion 106. The second portion 106 includes further includes a second side 116. The second side 116 may be oriented towards the user while operating the sexual stimulation device 100. In order to keep the connecting member 108 of the sexual stimulation device 100 being worn by the female user to achieve stability, at least one cord (see, 502 of FIG. 5) may be provided to fit the second side 116 of the optical effect generating member 112 to the user's skin and wrap around the user's waist to be worn as an accessory (as shown in FIG. 5).

Figure 2:
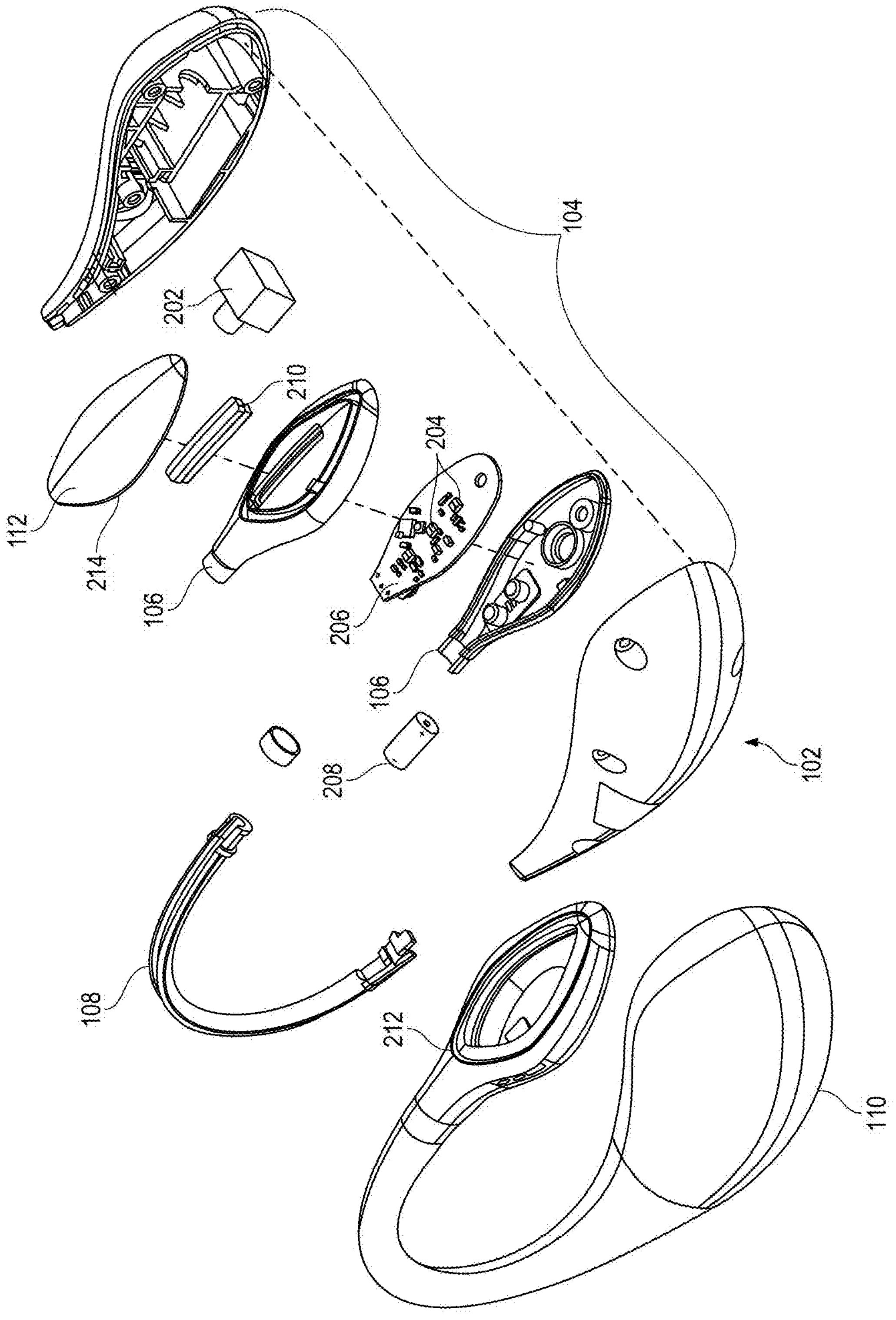
FIG. 2 illustrates an exploded view of the sexual stimulation device, in accordance with an embodiment of the present disclosure.

FIG. 2 illustrates an exploded view of the sexual stimulation device 100, in accordance with an embodiment of the present disclosure. The first portion 104 is adapted to support stimulation components of the sexual stimulation device 100. Specifically, the sexual stimulation device 100 includes an actuator (see, 202). The actuator 202 may be disposed in the first portion 104 of the sexual stimulation device 100. The actuator 202 may include at least one motor configured for operating the first portion 104 (or the sexual stimulation device 100) in a plurality of stimulation modes.

Figure 3A:
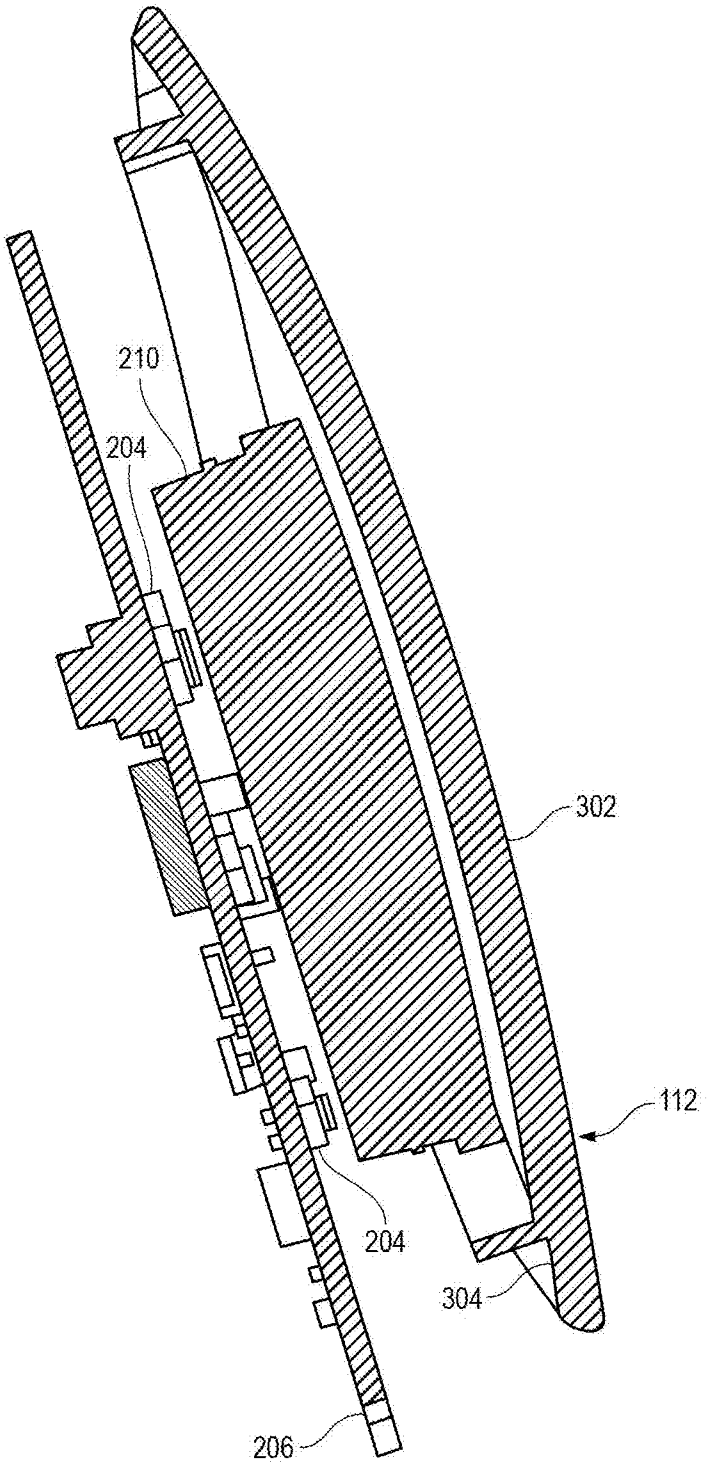
FIG. 3A is a cross-sectional view of the sexual stimulation device depicting the coupling of a radiating lighting element, a control circuitry, and an optical effecting generating member, in accordance with an embodiment of the present disclosure.

Further, the sexual stimulation device 100 includes a radiating lighting element 204, a control circuitry 206, and a power source 208. The power source 208 is disposed in the housing 102. The radiating lighting element 204 is disposed in the housing 102. Specifically, the radiating lighting element 204 and the control circuitry 206 are disposed in the second portion 106 (as shown in FIG. 3A). Further, the radiating lighting element 204 is operatively coupled to the optical effect generating member 112 and the control circuitry 206. The radiating lighting element 204 is configured to emit a first light source onto the optical effect generating member which will be explained further in detail. The radiating lighting element 204 may include light emitting diodes (LEDs) (e.g., red blue green (RGB) LEDs). The radiating lighting element 204 including the LEDs may form at least one dot-matrix display. Further, the control circuitry 206 may include electronics/electronic components (such as printed circuit board (PCB)), a processing module including one or more processing units (e.g., in a single-core configuration or a multi-core configuration) for performing one or more operations described herein.

Further, the power source 208 is configured to provide power supply (or electrical power) to the actuator 202, the radiating lighting element 204, and the control circuitry 206 for operating the sexual stimulation device 100 in an ON state from an OFF state. In particular, the user may provide input (press) on a power button (see, 118 of FIG. 1B) for operating the sexual stimulation device 100 for operating the sexual stimulation device 100 in the ON state and the OFF state.

In one embodiment, the power source 208 is configured to provide one of an alternating current output or a direct current output. In an embodiment, the power source 208 includes a direct current power source, such as a rechargeable battery (for example, a lithium-ion battery), operable to provide the required electrical power for the operation of the actuator 202, the radiating lighting element 204, and the control circuitry 206, and the like. Further, the power source 208 may include electrical and/or electronic components or circuits for enabling the use of wired or wireless charging. In an embodiment, the sexual stimulation device 100 may include a charging port (not shown in Figures) for enabling connection with an external power source to recharge the power source 208 (e.g., the rechargeable battery). For example, the charging port may be a magnetic charging port. Alternatively, the sexual stimulation device 100 may include a conventional charging port such as, but not limited to, a universal serial bus (USB) port Type-A or USB port Type-B or Micro USB port Type-B. In some embodiments, the power source 208 may include electrical and/or electronic components or circuits for enabling the use of alternating current to provide the required electrical power for the operation of the components such as the actuator 202, the control circuitry 206, the radiating lighting element 204, and the like.

Referring to FIG. 3A in conjunction with FIG. 2, a cross-sectional view of the sexual stimulation device 100 depicting the coupling of the radiating lighting element 204, the control circuitry 206, and the optical effecting generating member 112 is illustrated. As shown in FIG. 3A, the optical effect generating member 112 includes a first optical layer 302 and a second optical layer 304. The optical effect generating member 112 is mounted to the second portion 106 of the housing 102 as explained above. The optical effect generating member 112 may be a sheet-like component. The first optical layer 302 is exposed to an external environment and the second optical layer 304 is disposed within the second portion 106 of the housing 102. In other words, the optical effect generating member 112 covers the radiating lighting element 204 so that the second optical layer 304 is oriented toward the radiating lighting element 204. Further, the optical effect generating member 112 is configured to generate at least one optical effect through the first optical layer 302 based on receipt of at least one light source on at least the first optical layer 302 and the second optical layer 304 which is explained further in detail.

In one scenario, the optical effect generating member 112 is configured to receive a visible light directed onto the first optical layer 302. The visible light directed onto the first optical layer 302 may be referred to as a second light source of the at least one light source. The optical effect generating member 112 is configured to generate a second optical effect of the at least one optical effect in response to the second light source at the first optical layer 302. It is to be noted that the first optical layer 302 generates the second optical effect based on the sexual stimulation device 100 operating in either the ON state or the OFF state. In other words, the first optical layer 302 generates the second optical effect irrespective of the sexual stimulation device 100 being operated in the ON state or the OFF state. This is due to the second light source being received by the external environment. Further, the first optical layer 302 generates the second optical effect in response to the second light source based on one or more optical characteristics of the first optical layer 302. The optical properties associated with the first optical layer 302 may include, but not limited to, reflection, refraction, dispersion, and scattering. Thus, the second light source is either reflected, refracted, or scattered by the first optical layer 302 to provide the second optical effect. In one example, the first optical layer 302 may be coated with a coating material, which may be achieved through the use of a coating of vapor deposition, spraying, or plating, or alternatively, through the application of an in-mold decoration, a ChromaFlair coating or anodizing coating material to form an optical effect layer (i.e. the first optical layer 302) capable of generating the second optical effect such as reflection, diffraction, and scattering optical effects. In summary, the scenario above is not limited to the limitation of the production process of the optical effect generating member 112 as long as it can realize the rainbow color shown by the first optical layer 302.

In another example, the optical effect generating member 112 may be made using luminous ceramics, thus causing the optical effect generating member 112 to provide the second optical effect for a predetermined time (e.g., 12 hours) after absorbing visible light (or the second light source) for 10 to 20 minutes. Typically, the luminous ceramics incorporate high-tech luminescent colors into the traditional ceramic glaze. This optical effect generating member 112 is created by melting the luminescent colors into the glaze and firing it at high temperatures. The optical effect generating member 112 made using the luminous ceramics material absorbs various forms of natural light, such as sunlight or other scattered light sources, and retains the absorbed light energy for generating the second optical effect as explained above.

In addition, the optical effect generating member 112 may include a one-way mirror or other material combinations that can provide similar functions. It is to be noted that, as long as it is possible to realize the optical effect when the radiating lighting element 204 is switched off (or operated in an OFF condition), a light guiding element (see, 210 of FIG. 2) covered by the the optical effect generating member 112 is difficult to be observed by the naked eye.

In another scenario, the optical effect generating member 112 is configured to generate a first optical effect of the at least one optical effect in response to receipt of a first light source of the at least one light source emitted from the radiating lighting element 204. The control circuitry 206 is configured to at least operate the radiating lighting element 204 to emit the first light source onto the second optical layer 304 of the optical effect generating member 112. The radiating lighting element 204 may emit white light, monochromatic light, or a mixed color light. It is to be noted that the control circuitry 206 operates the radiating lighting element 204 to emit the first light source based on operating the sexual stimulation device 100 in the ON state.

Additionally, the sexual stimulation device 100 includes the light guiding element (see, 210 of FIG. 2) disposed in the housing 102. The light guiding element 210 is disposed between the second optical layer 304 and the radiating lighting element 204 (as shown in FIG. 3A). For example, the light guiding element 210 may be made using materials such as acrylic or polycarbonate. Further, such materials may be blended with white pigment to form a frosted effect, so that the radiating lighting element 204 is continuously reflected by the white pigment after it has been emitted into the light guiding element 210 to form a diffuse reflection effect. The light guiding element 210 is operatively coupled to the radiating lighting element 204 and the second optical layer 304 of the optical effect generating member 112. The light guiding element 210 is configured to direct the first light source emanating from the radiating lighting element 204 onto the second optical layer 304 of the optical effect generating member 112.

In some cases, there may be light spillage from the side edges of the light guiding element 210. In such cases, the light emitted from the light guiding element 210 may not be completely rendered on the second optical layer 304. In order to address the aforementioned technical issues, a cover member 310 may be used to cover the side wall of the light guiding element 210. The cover member 310 may be a layer of opaque film or any other material capable of preventing light spillage.

Figure 3B:
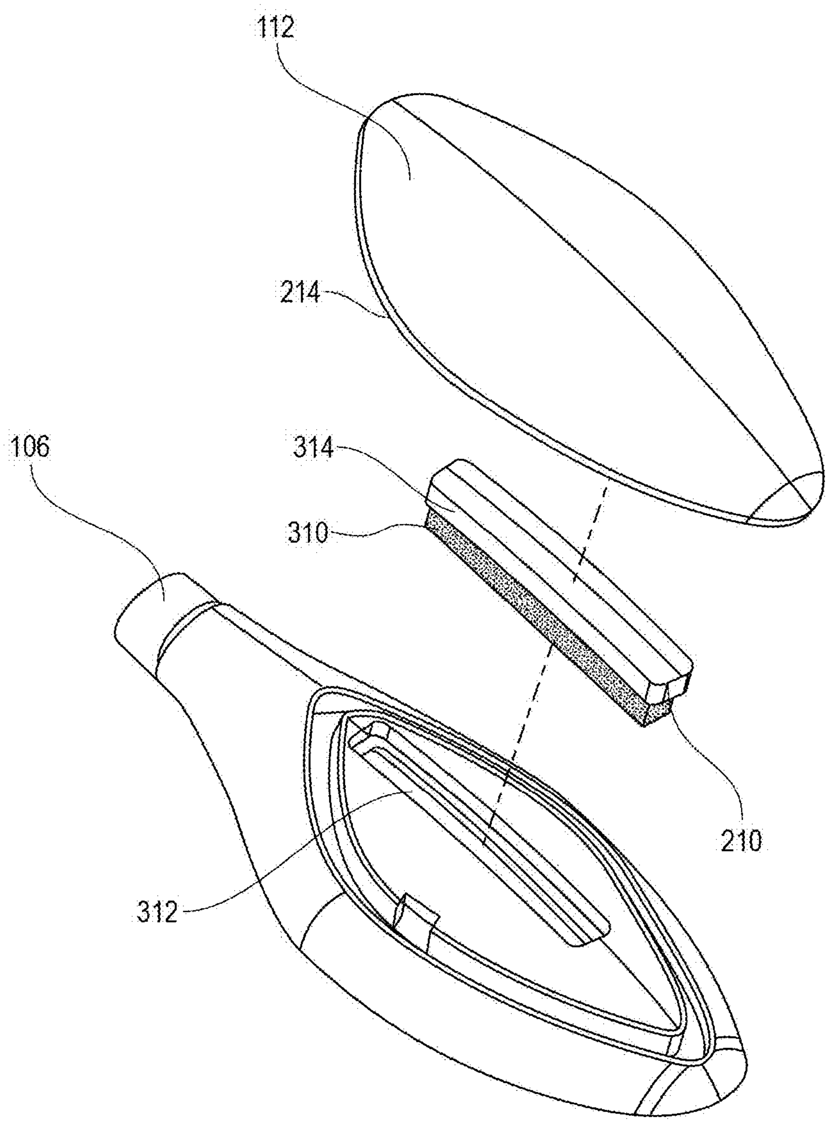
FIG. 3B illustrates a schematic representation of a cover member mounted to a portion of a light guiding element, in accordance with an embodiment of the present disclosure.

In some cases, the light guiding element 210 can run through a hole (see, 312 of FIG. 3B) of the housing 102. In such a case, a first edge (see, 314 of FIG. 3B) of the light guiding element 210 may be glued with the edge of the hole 312 so as to avoid penetration of liquid into the housing 102. Additionally, a second edge (see, 212 of FIG. 2) of the covering member 110 may be tightly fitted to a third edge 214 of the optical effect generating member 112 to further strengthen the waterproof performance of the sexual stimulation device 100. In contrast to the covering member 110 (made of silicone) that directly covers the light guiding element 210 or the radiating lighting element 204, this case can prevent the covering member 210 from interfering with the light colour of the light emitted from the radiating lighting element 204. Furthermore, the covering member 210 prevents water from entering the interior of the housing 102.

In some cases, the top surface of the light guiding element 210 may be situated between the first optical layer 302 and second optical layer 304, or even further, with the light guiding element 210 and the optical effect generating member 112 may be integrally molded. In such case, the light emitted from the radiating lighting element 204 located within the housing 102 can be guided to the entire surface of the first optical layer 302.

Additionally, the optical effect generating member 112, the light guide element 210, and the radiation lighting element 204 maybe entirely replaced by a display, such as an Organic Light-Emitting Diode (OLED) display. The signal and power supply wires of the OLED display can be connected to the control circuitry 206 after passing through the hole 103 of the housing 102. Once the OLED display has been installed, the power source 208 can be connected to the control circuitry 206, which will then provide power to the OLED display. In turn, the control circuitry 206 will also be able to control the OLED display to emit radiating light as explained above.

Further, the optical effect generating member 112 is configured to generate the first optical effect of the at least one optical effect through the first optical layer 304 in response to the first light source (e.g., the white light, the monochromatic light, or the mixed color light) emitted from the radiating lighting element 204 onto the second optical layer 304. It is to be noted that the first light source directed onto the second optical layer 304 is transmitted from the second optical layer 304 to the first optical layer 302 for causing the first optical effect. Similar to the second optical effect, the first optical layer 302 generates the first optical effect in response to the first light source based on the one or more optical characteristics of the first optical layer 302. Thus, the first light source is either reflected, refracted, or scattered by the first optical layer 302 to provide the first optical effect.

In another scenario, the first optical layer 302 may simultaneously receive the first light source and the second light source and generate the corresponding first optical effect and the second optical effect as explained above, In this scenario, the first optical layer 302 generates a third optical effect by superimposing the first optical effect and the second optical effect on the first optical layer 302 based at least on the one or more optical properties associated with the first optical layer 302.

Further, the control circuitry 206 is configured to monitor at least one operating parameter of the sexual stimulation device 100 related to providing sexual stimulation to one or more erogenous zones of the user. The at least one operating parameter may include, but not limited to, operating speed, rotation, intensity, and stimulation pattern. The operating parameters of the sexual stimulation device 100 may be adjusted based on operating the actuator 202. It is to be noted that the control circuitry 206 adjusts the operating parameters of the actuator 202 to operate the sexual stimulation device 100 (or the first portion 104) in the plurality of stimulation modes. The plurality of stimulation modes may include, but not limited to, a vibration stimulation, an oscillating stimulation, a tapping stimulation, a snapping stimulation, a swinging stimulation, a reciprocatory stimulation, and a sucking stimulation.

The control circuitry 206 is configured to dynamically control the radiating lighting element 204 in real-time to emit the first light source based at least on the at least one operating parameter of the sexual stimulation device 100 related to providing sexual stimulation to the user. In an example, the radiating lighting element 206 dynamically adjusts the parameters (e.g., wavelength, frequency, and light pattern) of the first light source 204 depending on the intensity of the operation of the actuator 202 of the sexual stimulation device 100. Further, dynamically controlling the radiating lighting element 204 to emit the first light source indicates a stimulation mode of the plurality of stimulation modes of the sexual stimulation device 100 corresponding to the at least one operating parameter. For example, the first light source including the red light may include the vibrating stimulation, the orange light indicates an oscillating stimulation, and so on.

Furthermore, the sexual stimulation device 100 may include at least one sensor (see, 120 of FIG. 1B) disposed in the housing 102. The at least one sensor 120 may include biosensor. In one embodiment, the sensors 120 are equipped in the second portion 106 of the sexual stimulation device 100. The sensors 120 are operatively coupled to the control circuitry 206. The sensors 120 are configured to determine at least one physiological parameter of the user. The physiological parameters of the user may include heart rate, blood pressure, respiratory rate, body temperature, and the like. The sensors 120 may implement an optical technique (e.g., Photoplethysmography (PPG)) for measuring the heart rate of the user while the user is utilizing the sexual stimulation device 100 to experience sexual stimulation. Generally, due to the color of the Blood, the blood reflects red light and absorbs green light. Further, the sensors 120 may include a light source configured to emit green light and photodiodes (not shown in Figures). Thus, when the heart beats, the blood flows into the wrist of the user and absorbs the green light emitted by the light source. Thus, based on the number of flashes of the green light, the heart rate is monitored by the photodiodes of the sensors 120. The heart rate (i.e., the physiological parameter) of the user is communicated to the control circuitry 206. In another embodiment, the sensors 120 may be an individual component located externally of the sexual stimulation device 100 and communicably coupled to the control circuitry 206 through a wired or wireless communication protocol. In both scenarios, the control circuitry 206 is configured to dynamically control the radiating lighting element 204 to emit the first light source corresponding to the at least one physiological parameter (e.g., the heart rate) of the user.

Figure 4A:
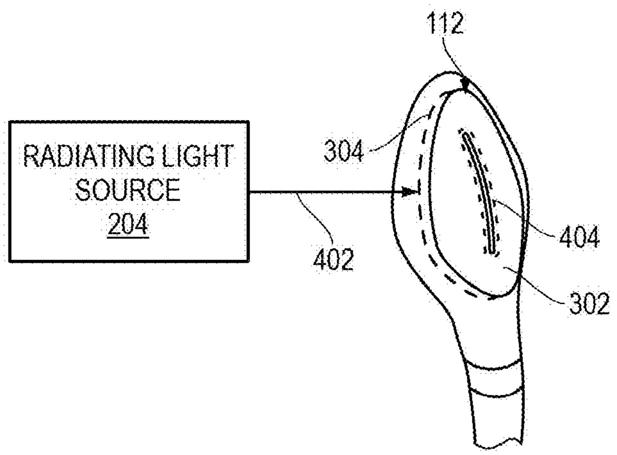
FIGS. 4A, 4B, and 4C illustrate example scenarios of the optical effect generating member to generate at least one optical effect in response to at least one light source, in accordance with an embodiment of the present disclosure.
Figure 4B:
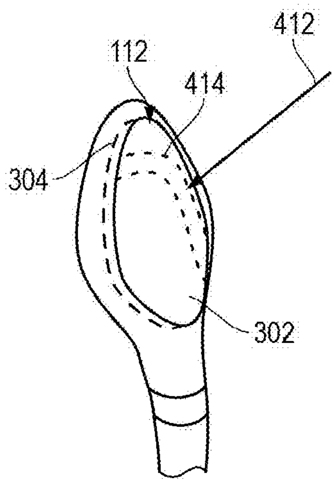
Figure 4C:
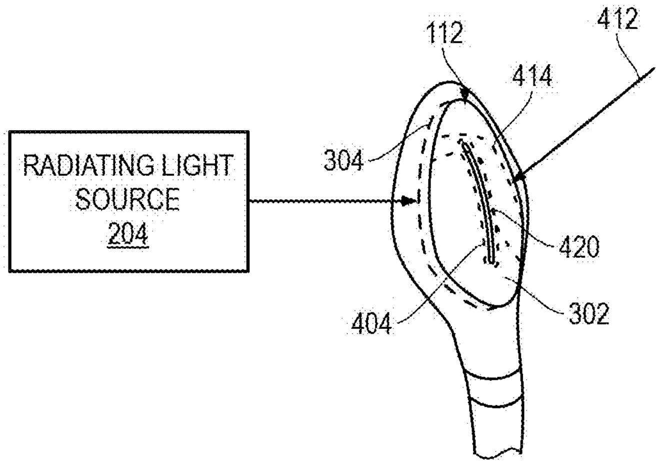

FIGS. 4A, 4B, and 4C illustrate example scenarios of the optical effect generating member 112 to generate the at least one optical effect in response to the at least one light source, in accordance with an embodiment of the present disclosure.

Referring to FIG. 4A, the optical effect generating member 112 (or the second optical layer 304) receives a first light source 402 being emitted from the radiating lighting element 204. The first light source 402 may be the white light, the monochromatic light, or the mixed color light being emitted by the radiating lighting element 204. The first light source 402 is transmitted from the second optical layer 304 to the first optical layer 302 via optical transmission. In response to the first light source 402, the first optical layer 302 generates a first optical effect (see, 404) of the at least one optical effect. For illustration purposes, the first optical effect 404 is represented as a region enclosed by the solid lines on the first optical layer 302. The region enclosed by the solid lines corresponds to the region of the first light source 402 being reflected/refracted/dispersed by the first optical layer 302. The first optical effect 404 is generated based on the optical properties of the first optical layer 302 as explained above. The generation of the first optical effect 404 is already explained in detail with references to FIGS. 1A-1C to FIGS. 3A-3B, therefore, it is not reiterated herein for the sake of brevity.

Referring to FIG. 4B, the optical effect generating member 112 (or the first optical layer 302) receives a second light source 412. The second light source 412 may be the ambient light of the sexual stimulation device 100. In response to the second light source 412, the first optical layer 302 generates a second optical effect (see, 414) of the at least one optical effect. For illustration purposes, the second optical effect 414 is represented as a region enclosed by the dashed lines on the first optical layer 302. The second optical effect 414 is generated based on the optical properties of the first optical layer 302 as explained above. Additionally, the second light source 412 (or the visible light) generates dispersion and/or various wavelengths of the visible light interfere with each other to emit rainbow colors. The generation of the second optical effect 414 is already explained in detail with references to FIGS. 1A-1C to FIGS. 3A-3B, therefore, it is not reiterated herein for the sake of brevity.

Referring to FIG. 4C, the first optical effect 404 and the second optical effect 414 generated by the first optical layer 302 in response to the first light source 402 and the second light source 404, respectively are superimposed on the first optical layer 302. In particular, the first optical layer 302 superimposes the first optical effect 404 and the second optical effect 414 to generate a third optical effect 420 on the first optical layer 302. For illustration purposes, the third optical effect 420 is depicted as a region of the first optical effect 404 overlapping on the second optical effect 414 on the first optical layer 302. Further, the generation of the third optical effect 420 is already explained in detail with references to FIGS. 1A-1C to FIGS. 3A-3B, therefore, it is not reiterated herein for the sake of brevity.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A sexual stimulation device, comprising:

a housing comprising a first portion and a second portion;

a connecting member connecting the first portion to the second portion, wherein the first portion corresponds to a stimulation portion for providing sexual stimulation to a user; and an optical effect generating member configured in the second portion, the optical effect generating member comprising a first optical layer exposed to an external environment and a second optical layer disposed opposite the first optical layer, wherein the optical effect generating member is configured to generate at least one optical effect via the first optical layer based on receipt of at least one light source, wherein the optical effect generating member is configured to generate a first optical effect of the at least one optical effect via the first optical layer in response to a first light source of the at least one light source received on the second optical layer, and wherein the optical effect generating member is configured to generate a second optical effect of the at least one optical effect via the first optical layer in response to a second light source of the at least one light source received on the first optical layer.

2. The sexual stimulation device as claimed in claim 1, further comprising:

a radiating lighting element disposed in the housing and operatively coupled to the optical effect generating member;

a control circuitry operatively coupled to the radiating lighting element, the control circuitry configured to at least operate the radiating lighting element to emit the first light source of the at least one light source onto the second optical layer of the optical effect generating member, wherein the control circuitry operates the radiating lighting element to emit the first light source based on operating the sexual stimulation device in an ON state; and a power source disposed in the housing, the power source configured to provide power supply to the radiating lighting element, and the control circuitry for operating the sexual stimulation device in the ON state.

3. The sexual stimulation device as claimed in claim 2, further comprising a light guiding element disposed in the housing, the light guiding element operatively coupled to the radiating lighting element, the first optical layer and the second optical layer of the optical effect generating member, wherein the light guiding element is configured to direct the first light source emanating from the radiating lighting element onto at least the first optical layer and the second optical layer of the optical effect generating member.

4. The sexual stimulation device as claimed in claim 2, wherein the control circuitry is further configured to at least:

monitor at least one operating parameter of the sexual stimulation device related to providing sexual stimulation to one or more erogenous zones of the user, the at least one operating parameter comprising operating speed, rotation, intensity, and stimulation pattern; and dynamically control the radiating lighting element to emit the first light source based at least on the at least one operating parameter of the sexual stimulation device related to providing sexual stimulation to the one or more erogenous zones of the user, wherein dynamically controlling the radiating lighting element to emit the first light source indicates a stimulation mode of a plurality of stimulation modes of the sexual stimulation device corresponding to the at least one operating parameter, the plurality of stimulation modes comprising a vibration stimulation, an oscillating stimulation, a tapping stimulation, a snapping stimulation, a swinging stimulation, a reciprocatory stimulation, and a sucking stimulation.

5. The sexual stimulation device as claimed in claim 2, further comprising at least one sensor disposed in the housing and operatively coupled to the control circuitry, the at least one sensor configured to determine at least one physiological parameter of the user, the at least one physiological parameter comprising a heart rate of the user, wherein the control circuitry is configured to dynamically control the radiating lighting element to emit the first light source corresponding to the at least one physiological parameter of the user.

6. The sexual stimulation device as claimed in claim 2, wherein the first light source emanates from the radiating lighting element onto the second optical layer.

7. The sexual stimulation device as claimed in claim 6, wherein the first optical layer generates the second optical effect based on the sexual stimulation device operating in one of an ON state and an OFF state.

8. The sexual stimulation device as claimed in claim 6, wherein the first light source and the second light source correspond to a visible light source, and wherein the first light source is transmitted from the second optical layer to the first optical layer for causing the first optical effect.

9. The sexual stimulation device as claimed in claim 6, wherein the first optical layer of the optical effect generating member is configured to generate the first optical effect and the second optical effect in response to the first light source and the second light source, respectively, based at least on one or more optical properties associated with the first optical layer.

10. The sexual stimulation device as claimed in claim 9, wherein the first optical layer is configured to at least:

simultaneously receive the first light source and the second light source at the first optical layer and generate the corresponding first optical effect and the second optical effect; and generate a third optical effect by superimposing the first optical effect and the second optical effect on the first optical layer based at least on the one or more optical properties associated with the first optical layer.

11. The sexual stimulation device as claimed in claim 1, wherein the connecting member is made of flexible materials.

12. The sexual stimulation device as claimed in claim 1, further comprising a covering member configured to cover at least a portion of the housing, wherein the covering member is made of silicone.

13. A sexual stimulation device for providing sexual stimulation and generating optical effects, the sexual stimulation device comprising:

a housing comprising a first portion and a second portion, and a connecting member connecting the first portion to the second portion, wherein the first portion corresponds to a stimulation portion for providing sexual stimulation to a user;

an optical effect generating member configured in the second portion, the optical effect generating member comprising a first optical layer exposed to an external environment and a second optical layer disposed within the housing;

a radiating lighting element disposed in the housing and operatively coupled to the optical effect generating member; and a light guiding element disposed in the housing, the light guiding element operatively coupled to at least the radiating lighting element, the first optical layer, and the second optical layer of the optical effect generating member, wherein the optical effect generating member is configured to generate at least one optical effect via the first optical layer on at least one of the first optical layer and the second optical layer, wherein the light guiding element is configured to direct a first light source emanating from the radiating lighting element onto the second optical layer of the optical effect generating member based on receipt of at least one light source, the at least one light source comprising the first light source being emitted by the radiating lighting element onto the light guiding element, wherein the optical effect generating member includes a one-way mirror configured to realize a second optical effect of the at least one optical effect when the radiating lighting element is operating in an OFF condition.

14. The sexual stimulation device as claimed in claim 13, further comprising:

a control circuitry operatively coupled to the radiating lighting element, the control circuitry configured to at least operate the radiating lighting element to emit the first light source of the at least one light source onto the second optical layer of the optical effect generating member, wherein the control circuitry operates the radiating lighting element to emit the first light source based on operating the sexual stimulation device in an ON state; and a power source disposed in the housing, the power source configured to provide power supply to the radiating lighting element, and the control circuitry for operating the sexual stimulation device in the ON state.

15. The sexual stimulation device as claimed in claim 14, wherein the control circuitry is further configured to at least:

monitor at least one operating parameter of the sexual stimulation device related to providing sexual stimulation to one or more erogenous zones of the user, the at least one operating parameter comprising operating speed, rotation, intensity, and stimulation pattern; and dynamically control the radiating lighting element to emit the first light source based at least on the at least one operating parameter of the sexual stimulation device related to providing sexual stimulation to the one or more erogenous zones of the user, wherein dynamically controlling the radiating lighting element to emit the first light source indicates a stimulation mode of a plurality of stimulation modes of the sexual stimulation device corresponding to the at least one operating parameter, the plurality of stimulation modes comprising a vibration stimulation, an oscillating stimulation, a tapping stimulation, a snapping stimulation, a swinging stimulation, a reciprocatory stimulation, and a sucking stimulation.

16. The sexual stimulation device as claimed in claim 14, further comprising at least one sensor disposed in the housing and operatively coupled to the control circuitry, the at least one sensor configured to determine at least one physiological parameter of the user, the at least one physiological parameter comprising a heart rate of the user, wherein the control circuitry is configured to dynamically control the radiating lighting element to emit the first light source corresponding to the at least one physiological parameter of the user.

17. The sexual stimulation device as claimed in claim 13, wherein the optical effect generating member is configured to generate a first optical effect of the at least one optical effect through the first optical layer in response to the first light source emanating from the radiating lighting element onto the second optical layer, wherein the optical effect generating member is configured to generate the second optical effect of the at least one optical effect through the first optical layer in response to the receipt of the second light source on the first optical layer, and wherein the first optical layer of the optical effect generating member is configured to generate the first optical effect and the second optical effect in response to the first light source and the second light source, respectively, based at least on one or more optical properties associated with the first optical layer.

18. The sexual stimulation device as claimed in claim 17, wherein the first optical layer is configured to at least:

simultaneously receive the first light source and the second light source at the first optical layer and generate the corresponding first optical effect and the second optical effect; and generate a third optical effect by superimposing the first optical effect and the second optical effect on the first optical layer based at least on the one or more optical properties associated with the first optical layer.

19. The sexual stimulation device as claimed in claim 13, further comprising a covering member configured to cover at least a portion of the housing, wherein the covering member is made of silicone.

* * * * *